United States Patent
de Alvarenga et al.

(10) Patent No.: US 12,422,517 B2
(45) Date of Patent: Sep. 23, 2025

(54) JAMMER RESILIENT RANGING SCHEME

(71) Applicant: NXP B.V., Eindhoven (NL)

(72) Inventors: Eduardo Pimentel de Alvarenga, Graz (AT); Marcel Medwed, Graz (AT); Tobias Schneider, Graz (AT); Erik Kraft, Graz (AT)

(73) Assignee: NXP B.V., Eindhoven (NL)

( * ) Notice: Subject to any disclaimer, the term of this patent is extended or adjusted under 35 U.S.C. 154(b) by 361 days.

(21) Appl. No.: 18/079,473

(22) Filed: Dec. 12, 2022

(65) Prior Publication Data

US 2024/0192307 A1 Jun. 13, 2024

(51) Int. Cl.
*G01S 5/14* (2006.01)

(52) U.S. Cl.
CPC ...................... *G01S 5/14* (2013.01)

(58) Field of Classification Search
CPC ........................................... G01S 5/14
USPC ........................................ 342/463
See application file for complete search history.

(56) References Cited

U.S. PATENT DOCUMENTS

| | | |
|---|---|---|
| 8,587,478 B1 | 11/2013 | Kang et al. |
| 2009/0253439 A1 | 10/2009 | Gantner et al. |
| 2022/0104166 A1 | 3/2022 | Schober et al. |
| 2022/0386214 A1 | 12/2022 | Kim et al. |

FOREIGN PATENT DOCUMENTS

| | | | | |
|---|---|---|---|---|
| CN | 108318860 A | * | 7/2018 | |
| CN | 109089206 A | * | 12/2018 | ............ H04W 4/021 |
| CN | 111830463 A | | 10/2020 | |

OTHER PUBLICATIONS

Di Pietro, Roberto, et al., "Key-less Jamming Mitigation via Gossiping", Journal of Network and Computer Applications, vol. 123, Jan. 2018; ISSN 1084-8045; https://doi.org/10.1016/j.jnca.2018.08.001; pp. 57-68.
FIRA, "FIRA Consortium UWM MAC Technical Requirements", Version 1.3.0-0.9r0; Oct. 2021; 80 pages.

* cited by examiner

*Primary Examiner* — Harry K Liu (57) ABSTRACT

In an ultra-wideband (UWB) communication network, a controller anchor changes which anchor of a group of anchors serves as initiator for each of multiple ranging rounds. Based on the capabilities of the anchors in the UWB communication network, the controller selects among multiple modes for designating which anchor serves as initiator for each ranging round. In a first mode, the anchors take turns serving as the initiator for successive ranging rounds in round robin fashion. In a second mode, the anchors randomly take turns serving as the initiator for ranging rounds. By dynamically selecting an initiator for each ranging round, launching a successful jamming attack becomes significantly more complicated.

25 Claims, 5 Drawing Sheets

| MODE 1 302 | |
|---|---|
| ROUND # | INITIATOR |
| 0 | ANCHOR 0 104 |
| 1 | ANCHOR 1 106 |
| 2 | ANCHOR 2 108 |
| 3 | ANCHOR 3 110 |
| 4 | ANCHOR 0 104 |
| 5 | ANCHOR 1 106 |
| 6 | ANCHOR 2 108 |
| ⋮ | ⋮ |

| MODE 2 402 | | |
|---|---|---|
| ROUND # | RANDOM NUMBER | INITIATOR |
| 0 | 61 | ANCHOR 1 106 |
| 1 | 42 | ANCHOR 2 108 |
| 2 | 13 | ANCHOR 1 106 |
| 3 | 2 | ANCHOR 2 108 |
| 4 | 19 | ANCHOR 3 110 |
| 5 | 32 | ANCHOR 0 104 |
| 6 | 71 | ANCHOR 3 110 |
| ⋮ | ⋮ | ⋮ |

JAMMER RESILIENT RANGING SCHEME

BACKGROUND

Radio frequency (RF) ranging systems can be used in localization systems to determine a spatial position of a node, such as a mobile device. Ultra-wideband (UWB) communication networks are often used to determine the two-dimensional or three-dimensional position of a node, for example in a building or another structure. Some UWB-based indoor position determination systems use a downlink Time Difference of Arrival (TDoA) measurement for estimating the position of a node.

Using downlink TDoA, multiple stationary anchor devices send signals to a mobile device according to a fixed schedule. The term "mobile device" as used herein refers to any electric device that is portable and may establish an UWB connection to anchor devices. A mobile device may for example be a mobile phone, a tag, a token, or a key. A mobile device may be associated with a target device (e.g., a car, a door, a transit gate, etc.). The mobile device receives the signals sent by the anchor devices and calculates the time difference of the signals' arrival at the mobile device. Thus, the mobile device, which is receiving signals from multiple synchronized anchor devices, can determine its own position without sending a message (packet) to an anchor device. However, radio frequency-based ranging systems are vulnerable to communication jamming attacks, in which a malicious user introduces a noisy signal in the communication channel to prevent or impede communication between devices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In a downlink TDoA ranging round, one anchor of a group of anchors serves as an initiator anchor and the other anchors in the group serve as responder anchors. The initiator anchor sends a ranging initiation message (RIM) that is received by the responders and the node. Each of the responder anchors responds to the RIM with a ranging response message (RRM) that is also received by the node. The time of arrival differences between the node's receipt of the RIM and each of the RRMs are calculated using the corresponding receive times at the node and the data within the messages. Based on the calculated time of arrival differences, the node calculates its position with respect to the group of anchors.

An attack on a single-cell UWB communication network can be successful by inserting a malicious signal that is similar to a signal expected by a receiver and that reaches the attacked receiver with higher power than the expected signal. A typical attack on a downlink-TDoA communication network affects only the receivers (either nodes or responder anchors) that are closer to the jammer radio than to an initiator anchor. Nonetheless, a properly placed jammer can reliably disrupt the functionality of a system consisting of multiple anchors implemented according to the FiRa Consortium UWB MAC Technical Requirements version 1.3.0-0.9r0, at least for specific target areas. In a typical setup, a constant initiator is used for a group of anchors. By identifying the initiator, an attacker can determine the best location to place one or more jammer radios to create "shadow zones" where downlink node localization is not possible. If one or more responder anchors are jammed, the responder anchor(s) will not receive the RIM and will therefore not respond to the RIM with a RRM, such that the node is unable to perform localization. Conversely, if only the initiator is jammed, localization is still possible, as the initiator only sends the RIM and listens to gain optional information from the anchors, but in the event the optional information is not received, the initiator continues and localization still succeeds.

FIGS. 1-4 illustrate techniques for changing which anchor of a group of anchors serves as initiator for each of multiple ranging rounds. One of the anchors is defined as a controller that configures the remaining anchors and the remaining anchors are designated as controlees. The controller polls the controlees for information regarding the controlees' capabilities and receives capability information from the controlees. Based on the capability information, the controller selects among multiple modes for designating which anchor serves as initiator for each ranging round. The controller broadcasts configuration parameters for the selected mode to the controlees. By dynamically selecting an initiator for each ranging round, launching a successful jamming attack becomes significantly more complicated. To illustrate, in a static initiator anchor scenario a malicious attacker can reliably create "shadow zones" by placing a jammer between the initiator and one or more responders. By dynamically changing the roles of the anchors between initiator and responders, even a successful attack would only disrupt localization for one ranging round, assuming that the jammer signal only reaches the initiator and none (or only a small amount) of the responders, before requiring the attacker to adjust the location of the jammer. Because the duration of each ranging round is short, successfully jamming multiple ranging rounds would be extremely difficult if not impossible.

In some embodiments, in a first mode, the controller anchor specifies that each anchor in the group of anchors that is capable of being an initiator takes a turn serving as initiator for each ranging round in a sequence of ranging rounds in a round-robin fashion. Each anchor is identified by a number, referred to herein as the ID. For example, in a four-anchor group, a first anchor is designated "anchor 0", a second anchor is designated "anchor 1", a third anchor is designated "anchor 2", and a fourth anchor is designated "anchor 3". In a first ranging round, anchor 0 serves as the initiator, in a second ranging round, anchor 1 serves as the initiator, in a third ranging round, anchor 2 serves as the initiator, and in a fourth ranging round, anchor 3 serves as the initiator. In a fifth ranging round, after each anchor has taken a turn as the initiator, the cycle repeats in a round-robin fashion, with anchor 0 serving as the initiator, and so on.

In a second mode, the controller anchor specifies that the anchors capable of being an initiator take turns in random (or pseudo-random) order serving as initiator. In some embodiments, the controller anchor and each anchor capable of being an initiator includes a pseudo random number generator (PRNG). The controller anchor transmits an initiator seed to the anchors capable of being an initiator and the anchors use the seed as an input to their respective PRNGs to generate a pseudo-random number that indicates which anchor serves as initiator for each ranging round. Thus, in some embodiments, if the PRNGs generate a pseudo-random number sequence such as 3, 1, 1, 0, 2, 3, 0, . . . , in a first ranging round, anchor 3 serves as the initiator, in a second ranging round, anchor 1 serves as the initiator, in a third ranging round, anchor 1 again serves as the initiator, in a fourth ranging round, anchor 0 serves as the initiator, and so on. In some embodiments, the modulus of the pseudo-random number indicates which initiator serves as initiator for each ranging round. In some embodiments, the controller encrypts the seed before transmitting the seed to the controlees.

The first mode, in which the anchors take turns as initiator in round-robin order, requires fewer local computations by the anchors and does not rely on a PRNG. However, an attacker could learn the order of the initiating anchors, which could aid in an attack. The second mode, in which the anchors take turns as initiator in pseudo-random order, depends on each anchor including a PRNG and requires more local computations in the anchors, but provides a higher level of security. In some embodiments, the controller selects the first mode to perform debugging.

Figure 1:
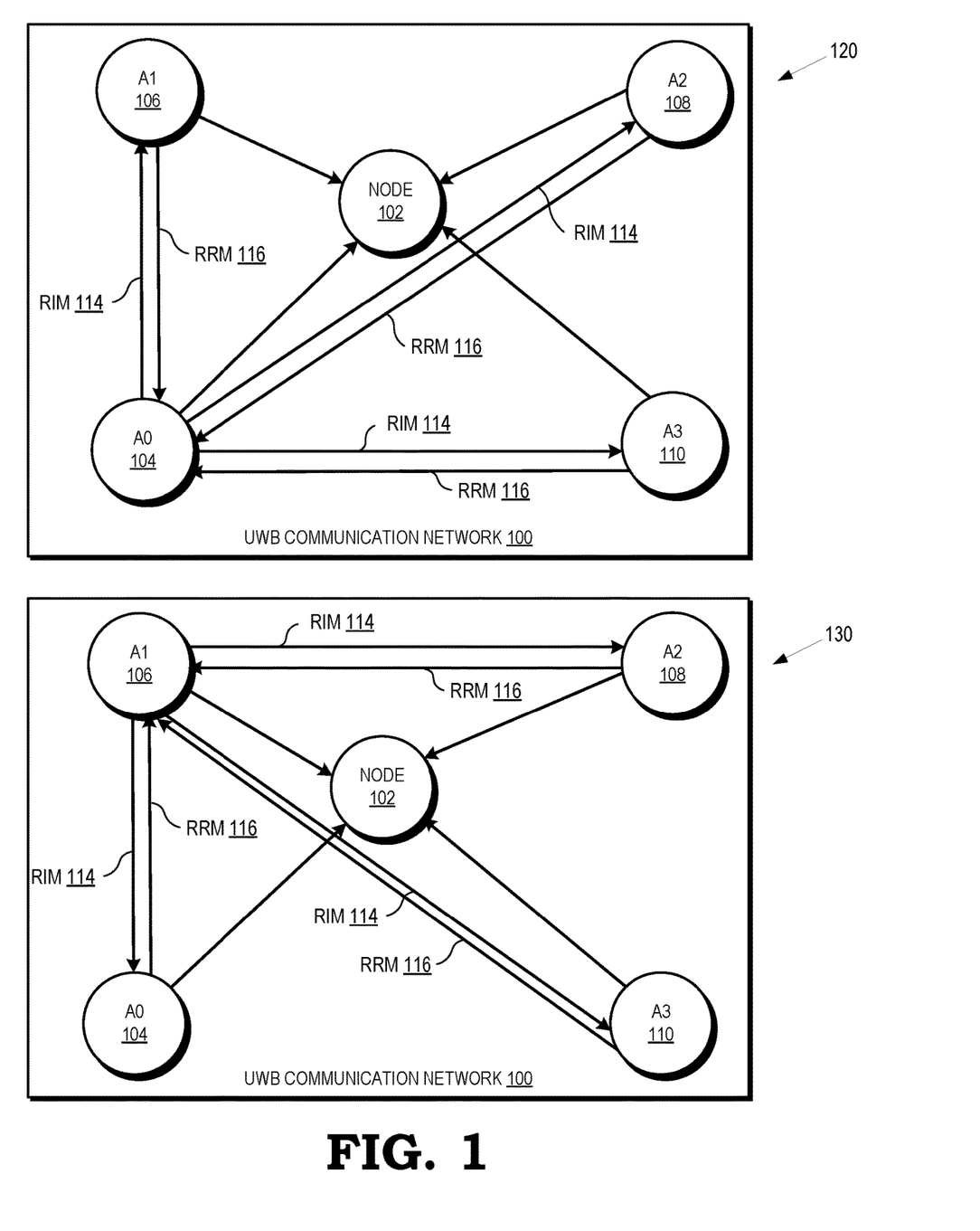
FIG. 1 is an illustration of a single-cell ultra-wideband communication (UWB) network including multiple anchors configured to change which anchor acts as an initiator for each of multiple ranging rounds in accordance with some embodiments.

FIG. 1 illustrates a single-cell ultra-wideband (UWB) communication network 100 (also referred to herein as UWB communication network 100) including multiple anchors configured to change which anchor acts as an initiator for each of multiple ranging rounds in accordance with some embodiments. The UWB communication network includes anchors A0 104, A1 106, A2 108, and A3 110. A node 102 uses downlink TDoA to determine its position with respect to the anchors. In an example, anchor A0 104 acts as a controller and anchors A1 106, A2 108, and A3 110 act as controlees. The controller polls the controlees to determine their capabilities and the controlees respond with a message indicating their capabilities. In some embodiments, the capabilities include whether the controlees are able to serve as an initiator or whether the controlees have PRNGs. Based on the capabilities of the controlees, the controller determines whether each controlee is capable of being an initiator and which modes the anchors in the UWB communication network 100 are able to implement. For example, if none of the controlees includes a PRNG, the controller determines that the first mode can be implemented but not the second mode.

In the illustrated example, anchor A0 104 determines that each of the anchors A0 104, A1 106, A2 108, and A3 110 are capable of serving as an initiator based on, for example, the anchors' responses when polled by the controller anchor A0 104. Based on the capabilities of the controlees (e.g., the controlees indicate that they do not have PRNGs) or to perform debugging, the controller anchor A0 104 selects the first mode (round robin mode) for dynamically changing which anchor acts as initiator for each ranging round.

For a first ranging round 120, controller anchor A0 104 serves as the initiator and anchors A1 106, A2 108, and A3 110 serve as responders. As initiator, anchor A0 104 sends a RIM 114 to each of the anchors A1 106, A2 108, and A3 110. In response, each of anchors A1 106, A2 108, and A3 110 sends a RRM 116. The node 102 receives each of the RIM 114 and the RRMs 116 and applies a localization algorithm to determine its position with respect to the anchors A0 104, A1 106, A2 108, and A3 110.

According to the selected round robin mode, for a second ranging round 130, anchor A1 106 serves as the initiator and anchors A0 104, A2 108, and A3 110 serve as responders. As initiator, anchor A1 106 sends a RIM 114 to each of the anchors A0 104, A2 108, and A3 110. In response, each of anchors A0 104, A2 108, and A3 110 sends a RRM 116. The node 102 receives each of the RIM 114 and the RRMs 116 and applies a localization algorithm to determine its position with respect to the anchors A0 104, A1 106, A2 108, and A3 110.

For subsequent ranging rounds (not shown), the role of initiator rotates among the anchors as follows: in a third ranging round, anchor A2 108 serves as the initiator and anchors A0 104, A1 106, and A3 110 serve as responders. As initiator, anchor A2 108 sends a RIM 114 to each of the anchors A0 104, A1 106, and A3 110. In response, each of anchors A0 104, A1 106, and A3 110 sends a RRM 116. The node 102 receives each of the RIM 114 and the RRMs 116 and applies a localization algorithm to determine its position with respect to the anchors A0 104, A1 106, A2 108, and A3 110. In a fourth ranging round, anchor A3 110 serves as the initiator and anchors A0 104, A1 106, and A2 108 serve as responders. As initiator, anchor A3 110 sends a RIM 114 to each of the anchors A0 104, A1 106, and A2 108. In response, each of anchors A0 104, A1 106, and A2 108 sends a RRM 116. The node 102 receives each of the RIM 114 and the RRMs 116 and applies a localization algorithm to determine its position with respect to the anchors A0 104, A1 106, A2 108, and A3 110. In a fifth ranging round, the role of initiator reverts to anchor A0 104.

Figure 2:
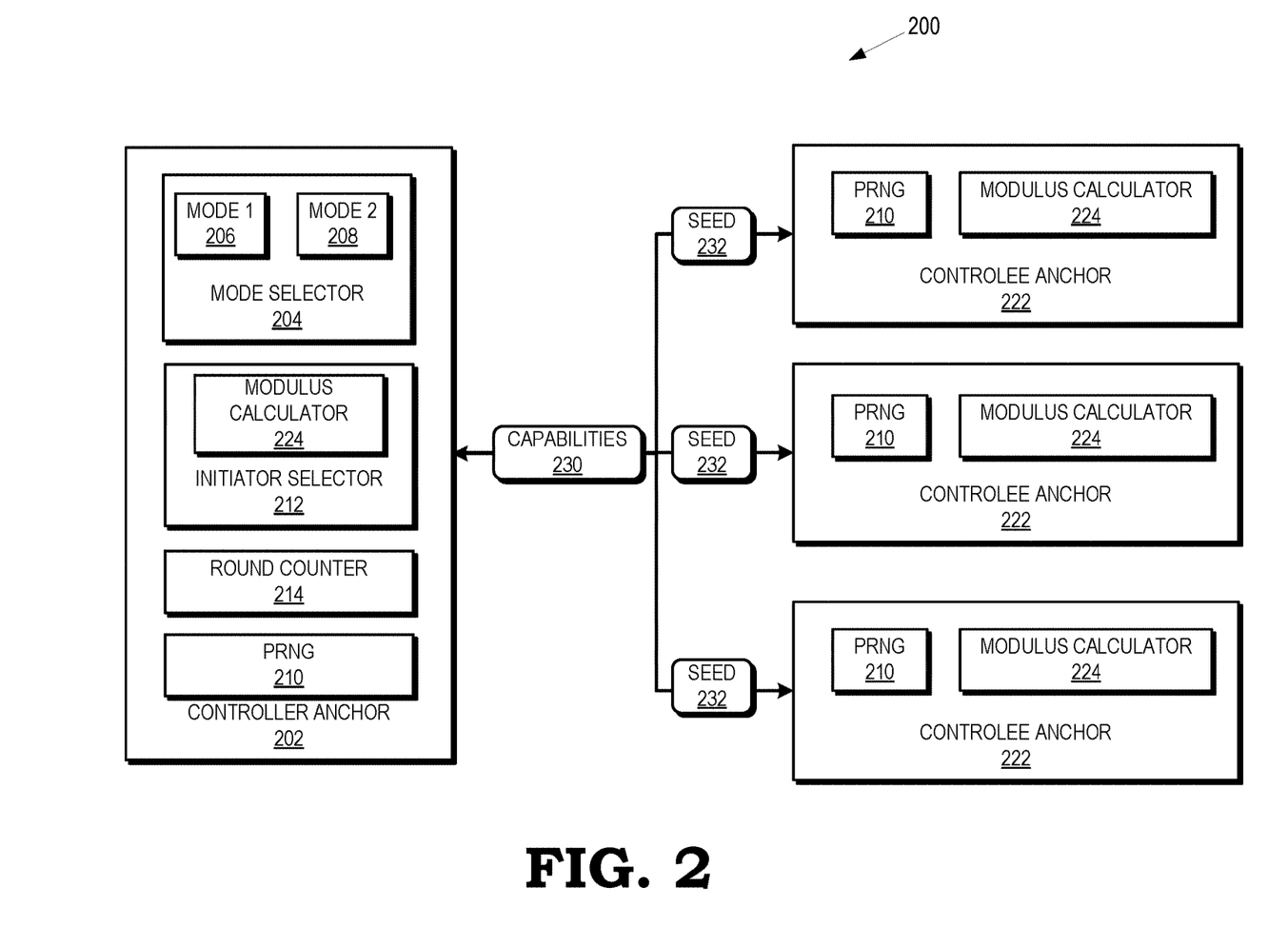
FIG. 2 is a block diagram of a controller anchor and controlee anchors of a single-cell UWB communication network in accordance with some embodiments.

FIG. 2 is a block diagram 200 of a controller anchor 202 and controlee anchors 222 of the UWB communication network 100 in accordance with some embodiments. In the illustrated example, the controller anchor 202 includes a mode selector 204, a pseudo random number generator (PRNG) 210, and a round counter 214. Each of the controlee anchors 222 includes a PRNG 210 and a modulus calculator 224. Each of the components of the controller anchor 202 and the controlee anchors 222 can be implemented in hardware, firmware, or software, or a combination thereof.

The mode selector 204 is configured to select a first mode, mode 1 206, or a second mode, mode 2 208, based on capabilities 230 of the controlee anchors 222 and the purpose of the ranging round. In some embodiments, the controlee anchors 222 transmit a packet indicating their respective capabilities 230 in response to a poll message from the controller anchor 202. Mode 1 206 is a round robin mode, and mode 2 208 is a pseudo-random mode in the illustrated example. In some embodiments, the mode selector 204 also has the option of selecting a third mode (not shown) in which the anchor designated as the initiator remains static for multiple ranging rounds.

In some embodiments, the controller anchor 202 includes an initiator selector 212. The initiator selector 212 is configured to designate an initiator for each ranging round based on the selected mode. The initiator selector determines which anchor to designate as the initiator based on a total number of anchors configured as initiators (referred to herein as "initiators") in the UWB communication network and a count of ranging rounds maintained by the round counter 214. In other embodiments, the controlee anchors 222 determine independently when each anchor is to serve as the initiator based on the mode selected by the controller anchor 202, the ranging round count, the total number of initiators in the UWB communication network, and the IDs of the anchors 222. In some embodiments, the initiator selector 212 includes a modulus calculator 224 to determine which anchor serves as initiator for each ranging round. In some embodiments, each of the controlee anchors 222 also includes a modulus calculator 224.

If the UWB communication network 100 is performing debugging, in some embodiments the mode selector 204 selects mode 1 206. In addition, if the controlee anchors 222 indicate that in their respective capabilities 230 that they do not include PRNGs 210, the mode selector 204 selects mode 1 206. In response to selecting mode 1 206, in some embodiments the initiator selector 212 selects as the initiator anchor the anchor having an ID that corresponds to the count of the current ranging round. The round counter 214 is configured to keep a count of the ranging rounds. For example, in some embodiments, the controller anchor 202 sets the round counter 214 to zero during an initialization of the UWB communication network 100. For each successive ranging round, the round counter 214 increments by one. The initiator selector calculates the modulus of the ranging round count and the number of initiators and designates as the initiator the anchor having the ID corresponding to the modulus:

$$\text{ranging\_round } \% \text{ number\_of\_initiators} = \text{initiator\_turn}$$

Thus, for an UWB communication network 100 having four initiators, for a first round in mode 1 206, the initiator selector 212 selects as the initiator the anchor having an ID of 0. For a second round in mode 1 206, the round counter 214 increments to 1 and the initiator selector 212 selects as the initiator the initiator having an ID of 1, and so on for each successive round. When each anchor in the UWB communication network 100 has had a turn serving as the initiator in mode 1 206, the cycle repeats starting with the anchor having an ID of 0 serving as the initiator.

In some embodiments, each anchor is programmed with logic to determine if the anchor is designated to serve as an initiator for the next ranging round. The controller anchor 202 sends a message to each of the controlee anchors 222 indicating that mode 1 206 has been selected, the total number of initiators, what the controlee anchors 222's respective IDs are, and what the next ranging round is according to the round counter 214. Based on this information, each controlee anchor 222 determines if its ID matches the modulus of the next ranging round count and the total number of initiators. If an anchor determines that ranging_round % number_of_initiators=initiator_turn, the anchor acts as initiator for the next ranging round. If an anchor determines that the modulus of the next ranging round count and the total number of initiators does not match its ID, the anchor acts as a responder for the next ranging round.

If at least a threshold number of controlee anchors 222 respond to the poll message from the controller anchor 202 with a packet indicating that their respective capabilities 230 include having a PRNG 210, and the purpose of the ranging round is for a node to perform localization, the mode selector 204 selects mode 2 208. In response to selecting mode 2 208, the controller anchor 202 transmits a seed 232 to each of the controlee anchors 222 having a PRNG 210 that are capable of serving as an initiator. The seed 232 is a number used to initialize the PRNGs 210, such as a linear feedback shift register or a cryptographic PRNG. In some embodiments, the controller anchor 202 encrypts the seed 232 before transmitting the seed 232 to the controlee anchors 222 to prevent interception of the seed 232 by a malicious attacker. The PRNGs 210 provide a signal that is deterministically dependent upon the seed 232. Thus, each PRNG 210 generates the same pseudo-random number based on the seed 232. In some embodiments, for mode 2 208, the initiator selector 212 designates as the initiator for each ranging round the anchor having an ID that corresponds to the modulus of the pseudo-random number output by the PRNGs 210 for the current ranging round and the total number of initiators:

$$\text{PRNG(initiator seed)}\hat{\ }\text{ranging\_round } \% \text{ number\_of\_initiators} = \text{initiator\_turn}$$

Figure 3:
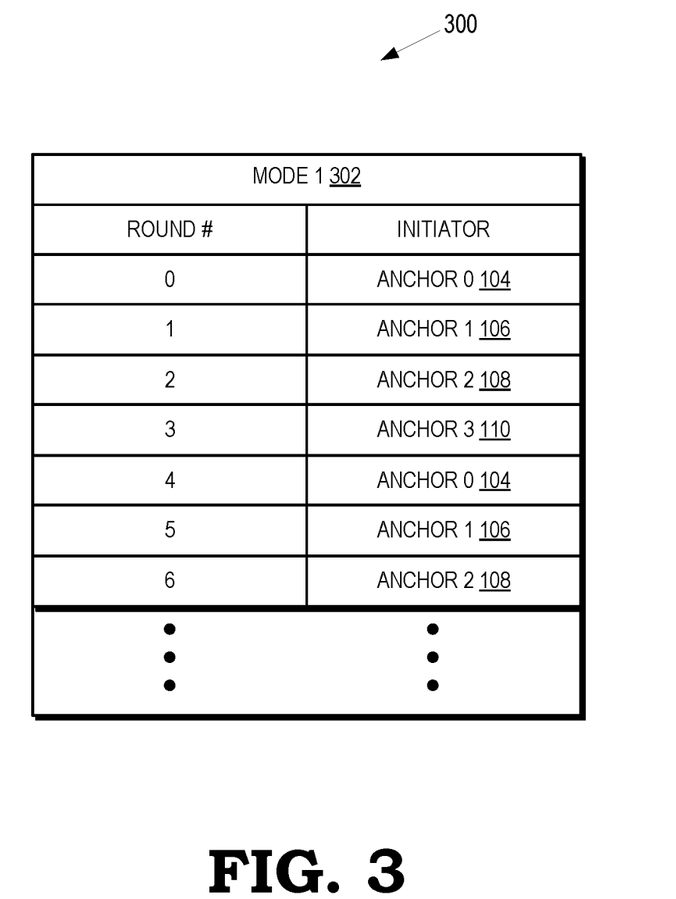
FIG. 3 is a block diagram of a table indicating which anchor of multiple anchors of a single-cell UWB communication network acts as an initiator for each of multiple ranging rounds in a first mode in accordance with some embodiments.

FIG. 3 is a block diagram of a table 300 indicating which anchor of multiple anchors of a UWB communication network acts as an initiator for each of multiple ranging rounds in mode 1 302 (round robin mode) in accordance with some embodiments. For an initial round, indicated by round counter 214 having a value of 0, for example, the initiator selector 212 designates anchor 0 104 to serve as the initiator. For a second round, the round counter 214 increments to 1, and the initiator selector 212 designates anchor 1 106 to serve as the initiator. For a third round, the round counter 214 increments to 2, and the initiator selector 212 designates anchor 2 108 to serve as the initiator. For a fourth round, the round counter 214 increments to 3, and the initiator selector 212 designates anchor 3 110 to serve as the initiator.

For a fifth round, the round counter 214 increments to 4. At this point, all of the anchors of the UWB communication network 100 have served as the initiator, so the cycle repeats, starting with the initiator selector 212 designating anchor 0 104 to serve as the initiator. For a sixth round, the round counter 214 increments to 5, and the initiator selector 212 designates anchor 1 106 to serve as the initiator.

Figure 4:
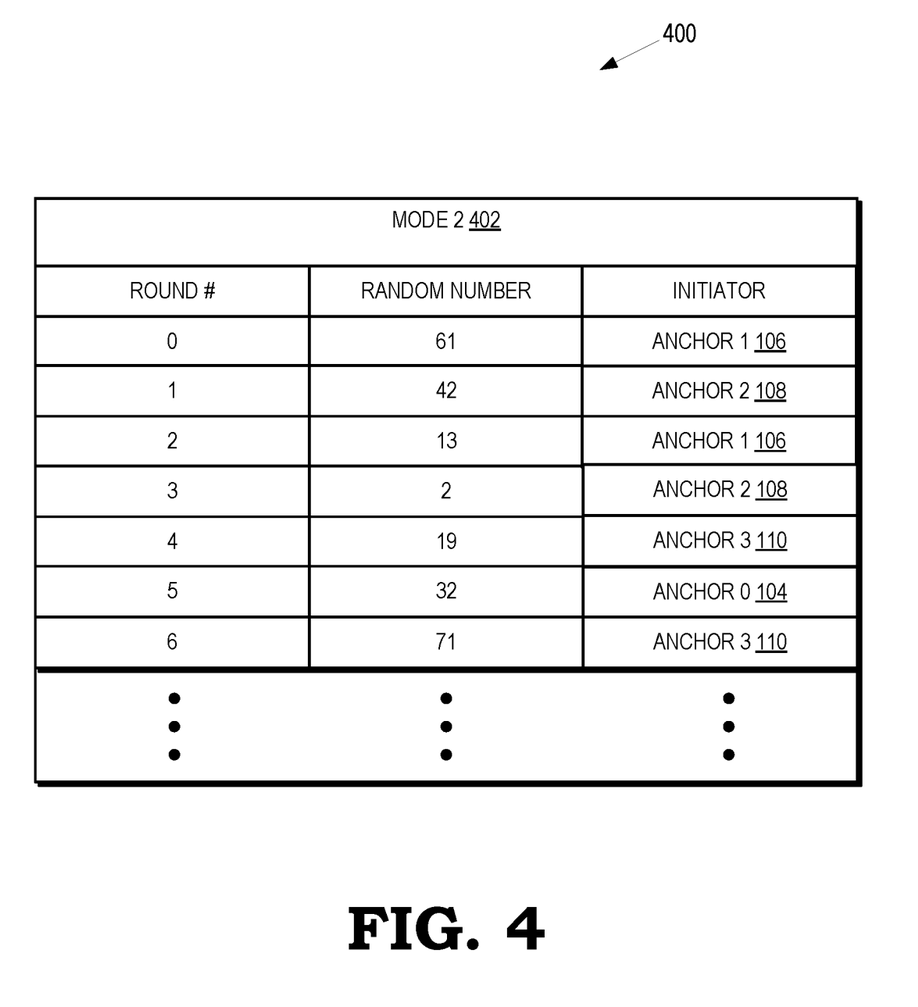
FIG. 4 is a block diagram of a table indicating which anchor of multiple anchors of a single-cell UWB communication network acts as an initiator for each of multiple ranging rounds in a second mode in accordance with some embodiments.

FIG. 4 is a block diagram of a table 400 indicating which anchor of four total anchors capable of acting as initiators of a UWB communication network acts as an initiator for each of multiple ranging rounds in mode 2 208 (pseudo-random mode) in accordance with some embodiments. In the illustrated example, for round 0, the PRNGs 210 output pseudo-random number 61. The anchors calculate 61%4=1, and determine that anchor 1 106 is the initiator for round 0. For round 1, the PRNGs 210 output pseudo-random number 42. The anchors calculate 42%4=2, and determine that anchor 2 108 is the initiator for round 1. For round 2, the PRNGs 210 output pseudo-random number 13. The anchors calculate 13%4=1, and determine that anchor 1 106 is the initiator for round 2. For round 3, the PRNGs 210 output pseudo-random number 2. The anchors calculate 2%4=2, and determine that anchor 2 108 is the initiator for round 3. For round 4, the PRNGs 210 output pseudo-random number 19. The anchors calculate 19%4=3, and determine that anchor 3 110 is the initiator for round 4. For round 5, the PRNGs 210 output pseudo-random number 32. The anchors calculate 32%4=0, and determine that anchor 0 104 is the initiator for round 5. For round 6, the PRNGs 210 output pseudo-random number 71. The anchors calculate 71%4=3, and determine that anchor 3 110 is the initiator for round 6. In some embodiments, the modulus calculator 224 of the initiator selector 212 of the controller anchor 202 calculates the modulus for each ranging round and transmits a signal to the controlee anchors 222 indicating which anchor is to serve as the initiator for each ranging round.

Figure 5:
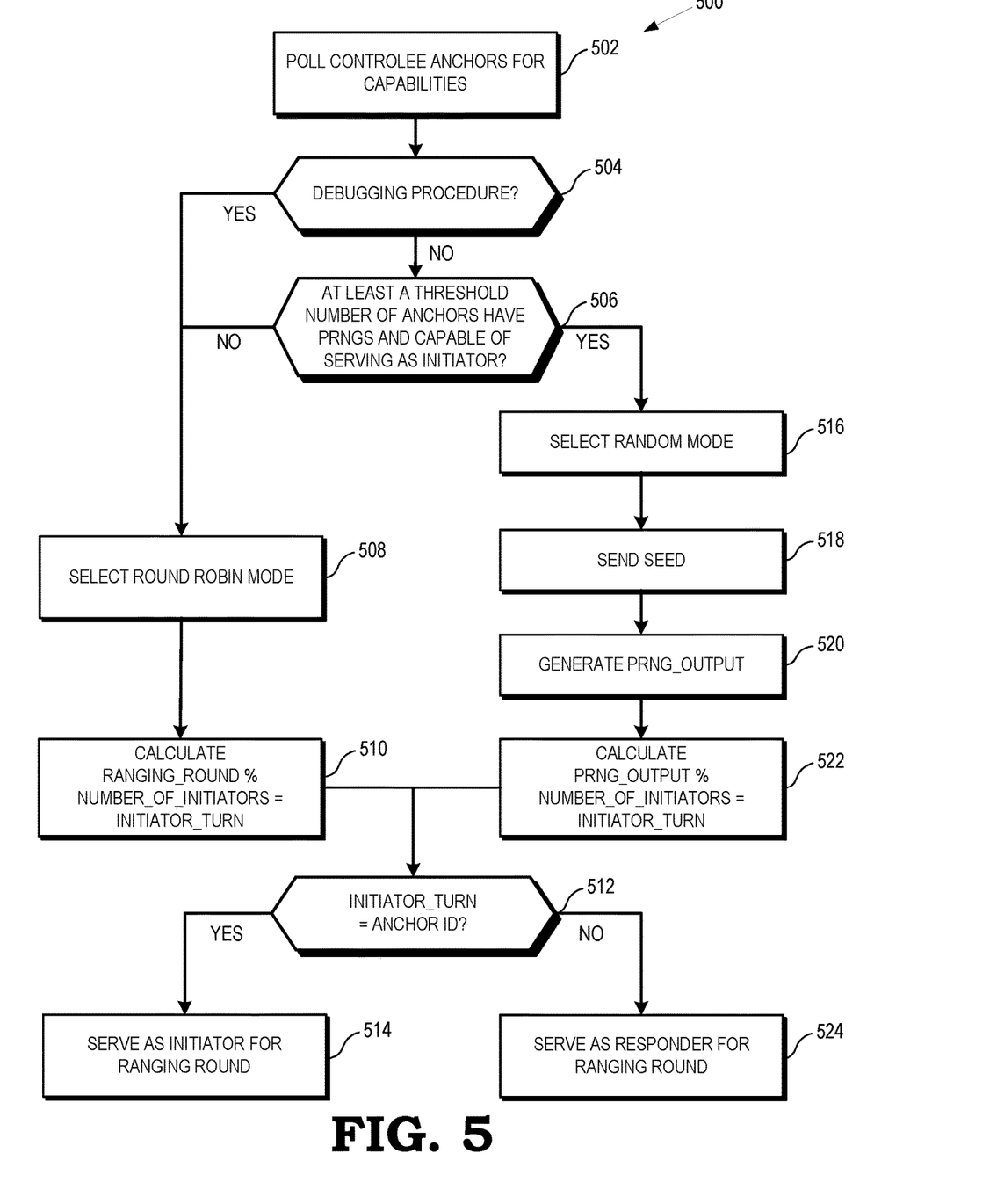
FIG. 5 is a flow diagram of a method of designating a different anchor of multiple anchors of a single-cell UWB communication network to act as an initiator for each of multiple ranging rounds in accordance with some embodiments.

FIG. 5 is a flow diagram of a method 500 of designating a different anchor of multiple anchors of a UWB communication network to act as an initiator for each of multiple ranging rounds in accordance with some embodiments. In some embodiments, the method 500 is performed by an UWB communication network such as the UWB communication network 100 illustrated in FIG. 1.

At block 502, the controller anchor 202 polls the controlee anchors 222 for their capabilities. In response to the poll, the controlee anchors 222 respond with their respective capabilities 230. At block 504, the controller anchor 202 determines if the UWB communication network 100 is to perform a debugging procedure. If, at block 504, the controller anchor 202 determines that the UWB communication network 100 is to perform a debugging procedure, the method flow continues to block 508. If, at block 504, the controller anchor 202 determines that the UWB communication network 100 is not to perform a debugging procedure, the method flow continues to block 506.

At block 506, the controller anchor 202 determines if at least a threshold number of anchors have PRNGs 210 and are capable of serving as an initiator. If, at block 506, the controller anchor 202 determines that fewer than a threshold number of anchors have PRNGs 210 and are capable of serving as an initiator, the method flow continues to block 508. At block 508, the mode selector 204 selects mode 1 206 (round robin mode). At block 510, the anchors calculate the modulus of the ranging round count and the number of initiators to determine the ID of the anchor that is to serve as the initiator for the next ranging round. In some embodiments, the initiator selector 212 of the controller anchor 202 calculates the modulus of the ranging round count and the number of initiators to determine the ID of the anchor that is to serve as the initiator for the next ranging round and communicates the anchor ID to the controlee anchors 222. The method flow then continues to block 512.

If, at block 506, the controller anchor 202 determines that at least a threshold number of anchors have PRNGs 210 and are capable of serving as an initiator, the method flow continues to block 516. At block 516, the mode selector 204 selects mode 2 208 (pseudo-random mode). At block 518, the controller anchor 202 sends a seed 232 to the controlee anchors 222. In some embodiments, the controller anchor 202 encrypts the seed 232 before transmitting the seed 232 to the controlee anchors 222. At block 520, the PRNGs 210 of each of the controller anchor 202 and the controlee anchors 222 generates a pseudo-random number based on the seed 232.

At block 522, the anchors calculate the modulus of the pseudo-random number output by the PRNGs 210 and the number of initiators to determine the ID of the anchor that is to serve as the initiator for the next ranging round. In some embodiments, the initiator selector 212 of the controller anchor 202 calculates the modulus of the pseudo-random number output by the PRNGs 210 and the number of initiators to determine the ID of the anchor that is to serve as the initiator for the next ranging round and communicates the anchor ID to the controlee anchors 222. The method flow then continues to block 512.

At block 512, each anchor determines if its anchor ID matches the ID of the anchor that is to serve as the initiator for the next ranging round. If, at block 512, an anchor determines that its ID matches the ID of the anchor that is to serve as the initiator for the next ranging round, the method flow continues to block 514. At block 514, the anchor serves as the initiator for the next ranging round. If, at block 512, an anchor determines that its ID does not match the ID of the anchor that is to serve as the initiator for the next ranging round, the method flow continues to block 524. At block 524, the anchor serves as a responder for the next ranging round.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
designating a first anchor of a plurality of anchors as an initiator for a first ranging round for determining a position of a node in a communication network comprising the node and the plurality of anchors, wherein designating the first anchor as the initiator causes the first anchor to initiate the first ranging round by sending a first ranging initiation message; and
designating a second anchor of the plurality of anchors as the initiator for a second ranging round that follows the first ranging round, wherein the second anchor is different from the first anchor, and wherein designating the second anchor as the initiator causes the second anchor to initiate the second ranging round by sending a second ranging initiation message.

2. The method of claim 1, wherein designating is based on one of a first mode and a second mode.

3. The method of claim 2, wherein the first mode specifies designating as the initiator an anchor based on a number of the ranging round in a sequence of ranging rounds.

4. The method of claim 2, wherein the second mode specifies pseudo-randomly designating an anchor as the initiator for each ranging round.

5. The method of claim 2, further comprising:
selecting the first mode or the second mode based on capabilities of the plurality of anchors.

6. The method of claim 2, further comprising:
selecting the first mode to perform debugging.

7. The method of claim 1, further comprising:
selecting a mode of a plurality of modes for determining which anchor to designate as the initiator for each round, wherein designating is based on the selected mode.

8. The method of claim 7, further comprising:
selecting the mode based on capabilities of the plurality of anchors.

9. The method of claim 1, wherein:
designating the first anchor as the initiator also causes anchors of the plurality of anchors other than the first anchor to serve as responders that are configured to send first ranging response messages in response to the first ranging initiation message; and
designating the second anchor as the initiator also causes anchors of the plurality of anchors other than the second anchor to serve as responders that are configured to send second ranging response messages in response to the second ranging initiation message.

10. A method comprising:
selecting a mode of a plurality of modes for determining which anchor, of a plurality of anchors, to designate as an initiator for each ranging round of a plurality of ranging rounds for determining a position of a node in a communication network comprising the node and the plurality of anchors, wherein a first mode of the plurality of modes specifies that the anchor designated as the initiator is based on a number of the ranging round in a sequence of ranging rounds; and
designating, based on the selected mode, a different anchor of the plurality of anchors as the initiator for each ranging round in the plurality of ranging rounds.

11. The method of claim 10, further comprising:
selecting the first mode to perform debugging.

12. A method comprising:
selecting a mode of a plurality of modes for determining which anchor, of a plurality of anchors, to designate as an initiator for each ranging round of a plurality of ranging rounds for determining a position of a node in a communication network comprising the node and the plurality of anchors, wherein a mode of the plurality of modes specifies pseudo-randomly selecting the anchor designated as the initiator for each ranging round; and
designating, based on the selected mode, a different anchor of the plurality of anchors as the initiator for each ranging round in the plurality of ranging rounds.

13. The method of claim 12, further comprising:
communicating a seed to each of the plurality of anchors; and
generating a pseudo-random number based on the seed, wherein the anchor designated as the initiator for each ranging round is based on the pseudo-random number.

14. A communication network comprising:
a node; and
a plurality of anchors configured to perform ranging rounds for determining a position of the node in the communication network, wherein the plurality of anchors comprises:
a plurality of controlee anchors; and
a controller configured to
cause a first anchor of a plurality of anchors to be designated as an initiator for a first ranging round of the ranging rounds,
cause the first anchor to initiate the first ranging round by sending a first ranging initiation message,
cause a second anchor of the plurality of anchors to be designated as the initiator for a second ranging round of the ranging round, wherein the second ranging round follows the first ranging round, and wherein the second anchor is different from the first anchor, and
cause the second anchor to initiate the second ranging round by sending a second ranging initiation message during the second ranging round.

15. The communication network of claim 14, wherein the controller anchor is further configured to:
select a mode of a plurality of modes for determining which anchor to designate as the initiator for each round, wherein designating is based on the selected mode.

16. The communication network of claim 15, wherein the controller anchor is further configured to:
select the mode based on capabilities of the plurality of anchors.

17. The method of claim 14, wherein the controller is further configured to:
cause anchors of the plurality of anchors other than the first anchor to serve as responders during the first ranging round, and cause anchors of the plurality of anchors other than the second anchor to serve as the responders during the second ranging round.

18. A communication network comprising:
a node; and
a plurality of anchors configured to perform ranging rounds for determining a position of the node in the communication network, wherein the plurality of anchors includes
a plurality of controlee anchors, and
a controller configured to
  select a mode of a plurality of modes for determining which anchor of the plurality of anchors to designate as an initiator for each round of a sequence of ranging rounds, and
  designate, based on the selected mode, a different anchor of the plurality of anchors as the initiator for each round of the sequence of ranging rounds, and
wherein a first mode of the plurality of modes specifies that the anchor designated as the initiator is based on a number of the ranging round in the sequence of ranging rounds.

19. The communication network of claim 18, further comprising:
selecting the first mode to perform debugging.

20. The communication network of claim 18, wherein a second mode of the plurality of modes specifies pseudo-randomly selecting the anchor designated as the initiator for each ranging round.

21. A method performed in a communication network that includes a node and a plurality of anchors, the method comprising:
generating, by a pseudo-random number generator of each of a plurality of controlee anchors of the plurality of anchors, a first pseudo-random number;
designating, by a controller based on the first pseudo-random number, a first anchor of the plurality of anchors as an initiator for a first ranging round for determining a position of the node;
generating, by the pseudo-random number generator of each of the plurality of controlee anchors, a second pseudo-random number; and
designating, by the controller based on the second pseudo-random number, a second anchor of the plurality of anchors as the initiator for a second ranging round for determining the position of the node, wherein the second ranging round follows the first ranging round, and wherein the second anchor is different from the first anchor.

22. The method of claim 21, further comprising:
designating, by the controller, anchors of the plurality of anchors other than the first anchor to serve as responders for the first ranging round; and
designating, by the controller, anchors of the plurality of anchors other than the second anchor to serve as responders for the second ranging round.

23. The method of claim 21, further comprising:
communicating, by the controller, a seed to each of the plurality of anchors; and
generating, by the pseudo-random number generator of each of the plurality of controlee anchors, the first pseudo-random number based on the seed.

24. A method performed in a communication network that includes a node and a plurality of anchors, the method comprising:
designating, by a controller, a first controlee anchor of the plurality of anchors as an initiator for a first ranging round for determining a position of the node based on the first anchor being included in a table that identifies each controlee anchor; and
for each next ranging round after the first ranging round, designating, by the controller in a round-robin order, a next controlee anchor of the plurality of anchors identified in the table as the initiator for the next ranging round for determining the position of the node based on the controller determining that the next controlee anchor is a next anchor in the table.

25. The method of claim 24, further comprising:
designating, by the controller, controlee anchors of the plurality of anchors other than the first controlee anchor to serve as responders for the first ranging round; and
designating, by the controller, controlee anchors of the plurality of anchors other than the next controlee anchor to serve as responders for the next ranging round.

* * * * *